(12) United States Patent
Hoover

(10) Patent No.: US 10,900,549 B2
(45) Date of Patent: Jan. 26, 2021

(54) MECHATRONIC SYSTEM WITH SHOCK ABSORBER

(71) Applicant: SCHAEFFLER TECHNOLOGIES AG & CO. KG, Herzogenaurach (DE)

(72) Inventor: Jason Hoover, Charlotte, NC (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 246 days.

(21) Appl. No.: 16/056,943

(22) Filed: Aug. 7, 2018

(65) Prior Publication Data
US 2020/0049239 A1 Feb. 13, 2020

(51) Int. Cl.
F16H 25/20 (2006.01)
F16F 13/00 (2006.01)
F16H 25/22 (2006.01)

(52) U.S. Cl.
CPC ....... *F16H 25/2021* (2013.01); *F16F 13/007* (2013.01); *F16H 25/2252* (2013.01); *F16H 2025/2075* (2013.01)

(58) Field of Classification Search
CPC ............ F16H 25/2021; F16H 13/007; F16H 25/2252; F16H 2025/2075
See application file for complete search history.

(56) References Cited

U.S. PATENT DOCUMENTS

| 3,965,761 | A | * | 6/1976 | Stanley | F16H 25/2266 74/424.92 |
| 4,050,319 | A | * | 9/1977 | Stanley | F16H 25/2266 74/424.92 |
| 4,884,466 | A | * | 12/1989 | Duruisseau | F16H 25/2252 74/424.92 |
| 5,027,667 | A | * | 7/1991 | Weyer | B60G 21/0553 74/424.92 |
| 6,098,479 | A | * | 8/2000 | Hoermansdoerfer | ........ B60T 13/741 475/333 |
| 8,082,818 | B2 | * | 12/2011 | Sugitani | F16H 25/2252 74/424.91 |
| 2006/0196293 | A1 | * | 9/2006 | Gerhardt | F16H 25/2252 74/424.92 |
| 2006/0266146 | A1 | * | 11/2006 | Waide | H02K 7/06 74/424.92 |
| 2016/0348775 | A1 | | 12/2016 | Schumann et al. | |

FOREIGN PATENT DOCUMENTS

| DE | 102011075950 A1 | 11/2012 |
| DE | 102011080914 A1 | 2/2013 |
| EP | 2213907 A1 | 8/2010 |

* cited by examiner

Primary Examiner — David M Fenstermacher
(74) Attorney, Agent, or Firm — Brooks Kushman P.C.

(57) ABSTRACT

A mechatronic device, such as a rod-style linear actuator, is disclosed having a shock absorber. In embodiments, the device includes a threaded screw that, when rotated, is also forced to move linearly. A drive nut assembly is disposed about the screw and includes a planetary roller assembly with planetary rollers with threading that engage the threaded screw. The shock absorber is disposed linearly adjacent to the planetary roller assembly and is configured to absorb and/or dissipate a static shock load transmitted through the device so as to protect the screw. The shock absorber may be a polymeric cylindrical member disposed about the screw and contacting the planetary roller assembly via springs.

20 Claims, 2 Drawing Sheets

MECHATRONIC SYSTEM WITH SHOCK ABSORBER

TECHNICAL FIELD

The present disclosure relates to a mechatronic system (e.g., a linear actuator) with a shock absorber.

BACKGROUND

Linear actuators are well-known in various industries, including automotive, manufacturing, tooling, clamping, etc. When actuated, the linear actuators move a subject device linearly. Mechatronic devices can also include linear actuators, in which a motor is configured to rotate a rod, and components within the mechatronic device for the rod to also move linearly. Planetary roller screws, also known as planetary screw drives, are one type of linear actuator. In a planetary roller screw, a central screw is surrounded by planetary rollers or gears which engage the threading of the screw as the screw rotates. This allows the screw to rotate within the planetary rollers, and also allows the planetary rollers to rotate about the screw.

SUMMARY

In one embodiment, a planetary roller screw is configured to convert rotary motion into linear motion or vice versa. The planetary roller screw includes an outer housing, a hollow push tube disposed within the outer housing and extending along a linear axis within the outer housing, and a threaded spindle configured to move axially along the linear axis and rotate about the linear axis. The threaded spindle has external threading. A drive nut assembly is disposed radially between the threaded spindle and the push tube. The drive nut assembly includes a plurality of planetary rollers arranged about the threaded spindle, with each planetary roller having (i) internal threading engaged with the external threading of the threaded spindle, and (ii) external threading. The drive nut assembly also includes an outer ring having (i) internal threading engaged with a portion of the external threading of the planetary rollers, and (ii) an outer surface engaged with an internal surface of the push tube. The drive nut assembly also includes a shock absorber mechanically coupled to the outer ring, disposed about the threaded spindle and configured to absorb a shock load provided to the threaded spindle.

In another embodiment, a rod-style actuator includes a housing, a threaded rod configured to move linearly through the housing, and a drive nut assembly. The drive nut assembly is disposed radially between the threaded rod and the housing, and has having a threaded inner surface engaging the threaded rod and a non-threaded outer surface engaging the housing. The drive nut assembly has a cylindrical polymeric shock absorber disposed about the threaded rod and configured to absorb a shock load provided to the threaded rod.

In yet another embodiment, a mechatronic linear actuator includes a rod having external threading, as well as one or more rollers disposed about the rod, each roller having (i) internal threading engaged with the external threading of the rod, and (ii) external threading. An outer ring has internal threading engaged with the external threading of each of the one or more rollers. A shock absorber is disposed about the rod and axially proximate to the outer ring. The shock absorber is configured to axially compress when subjected to an axial shock load to inhibit the rod from being mechanically overloaded.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain mechatronic systems such as linear actuators are incapable of handling large shock loads. According to various embodiments, a mechatronic system or mechatronic device, such as a linear actuator, is disclosed herein that includes a shock absorber. As will be described, the shock absorber reduces the shock load on the system. The shock absorber reduces the loading of the system to prevent damage to the mechanical components that transmit the shock load once they are realized.

Figure 1:
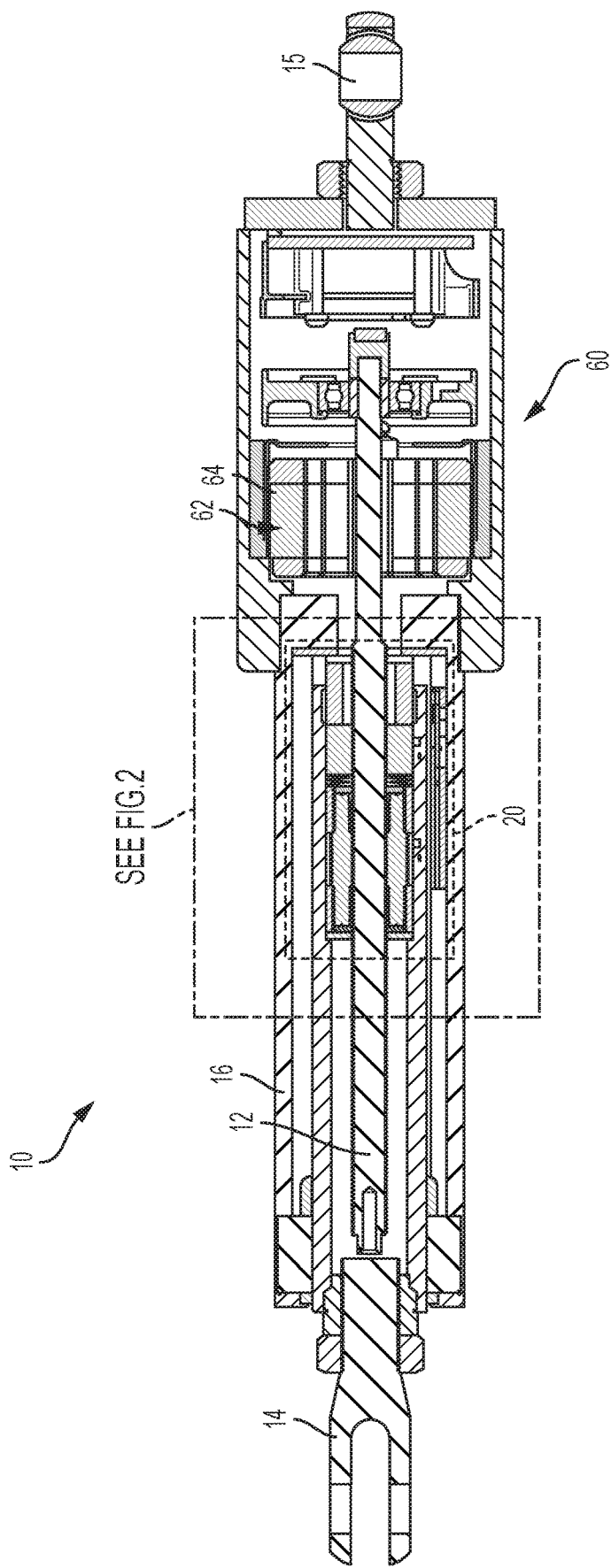
FIG. 1 is a cross-sectional view of a planetary roller screw, according to one embodiment.
Figure 2:
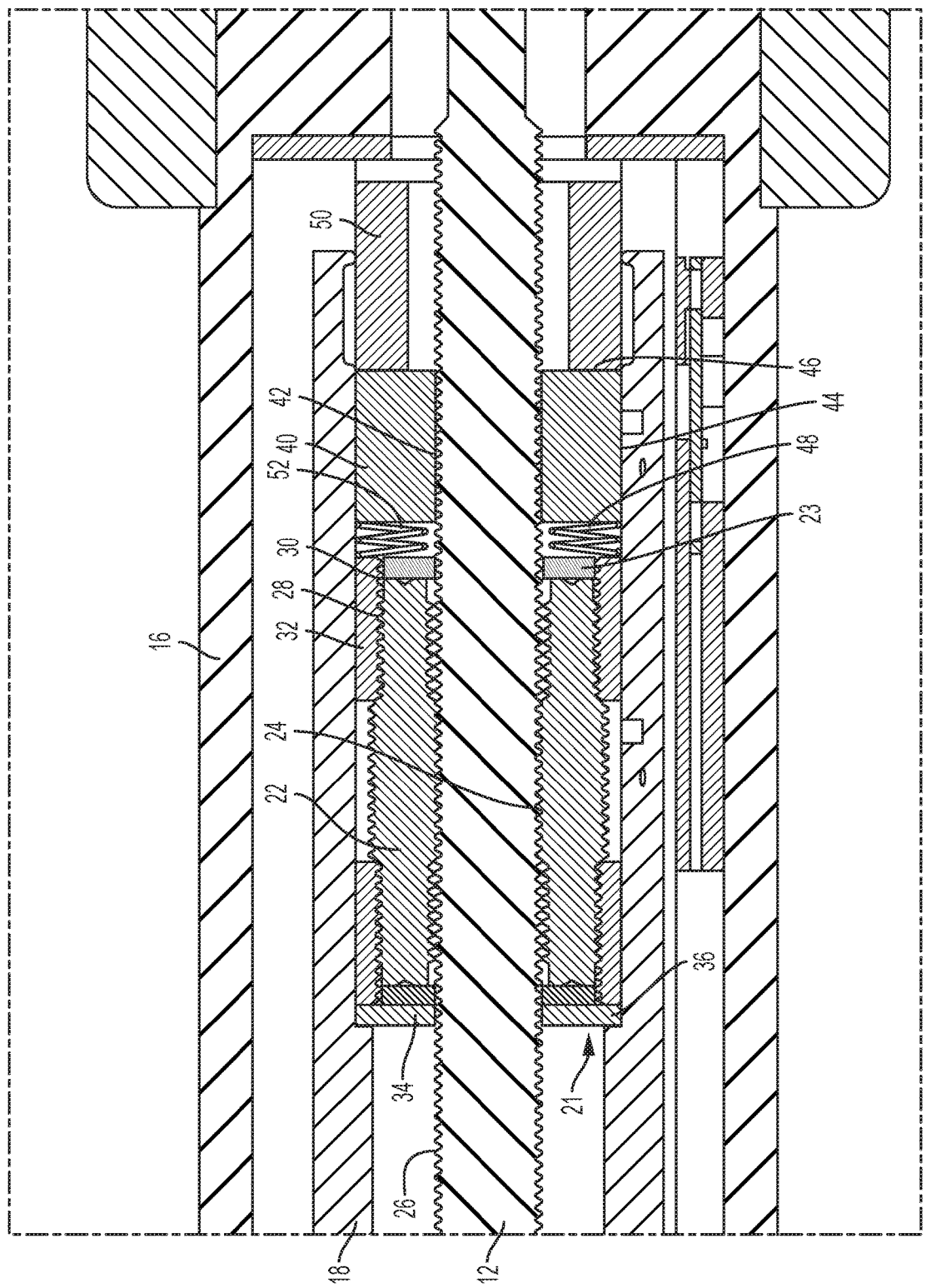
FIG. 2 is an enlarged cross-sectional view of a portion of the planetary roller screw of FIG. 1, focusing on a drive nut assembly and a shock absorber integrated into the planetary roller screw, according to one embodiment.

The shock absorber disclosed herein can be applied to a variety of linear actuators and other types of mechatronic systems. FIGS. 1-2 show a cross-sectional view of one embodiment of a linear actuator 10. In the illustrated embodiment, the linear actuator is a planetary roller screw, also referred to as a planetary screw drive, a roller screw, or satellite roller screw. The planetary roller screw 10 is a screw-type actuator, rod-style actuator or the like that pushes a rod in and out, in which linear motion is converted into rotational motion, or vice versa.

The planetary roller screw 10 includes a threaded rod, spindle, or screw 12 extending along a linear axis. The planetary roller screw 10 has a mechanical connection (e.g., a clevis) configured to attach to an external mechanical component to which linear actuation or movement is desired. For example, a clevis 14 may be mechanically connected to the screw 12 such that the two rotate together. In another embodiment, the clevis 14 can be integrally formed with the screw 12. The clevis 14 provides a connection point to a component that is being acted upon with linear movement. For example, the planetary roller screw 10 can be part of a lawn mower deck, in which the deck is coupled to the clevis 14; as the screw 12 is moved linearly via the actuation described below, the clevis moves therewith to move the lawn mower deck vertically to raise or lower the deck. Other implementations of the planetary roller screw 10 are contemplated, in particular embodiments in which linear movement of a component is desired. A second clevis 15 may be provided at an opposite end from the clevis 14 to connect to a second external mechanical component.

The screw 12 is configured to move linearly through an outer housing 16 with a cylindrical cavity sized to receive the screw 12. The screw 12 is also surrounded by a sleeve or push tube 18. The screw 12 may be non-rotatably coupled to the push tube 18 such that as the screw 12 is moved axially through the outer housing 16, the push tube 18 is also moved axially through the outer housing 16. In another embodiment, the push tube 18 is not provided, and the drive nut assembly described below engages directly with an inner surface of a sleeve or housing. The push tube 18 can also be referred to as an inner housing disposed within the outer housing 16.

Within the push tube 18 is a drive nut assembly 20, the components of which are enlarged in FIG. 2. The drive nut assembly 20 is configured to rotate about the screw 12. In particular, the drive nut assembly includes a planetary roller assembly 21 having plurality of planetary rollers 22 arranged annularly about the screw 12. Planetary roller spaces 23 are located on either axial end of the planetary rollers 22. The planetary rollers 22 each include internal threading 24 configured to mate with the corresponding external threading 26 of the screw 12. In another embodiment, the planetary rollers 22 include balls that travel along the external threading 26 of the screw as the screw rotates between the planetary rollers. The planetary rollers 22 also include external threading 28. The external threading 28 of the planetary rollers 22 engage corresponding internal threading 30 of outer rings 32. The outer rings 32 may have a smooth outer surface (i.e., not threaded) so that the outer rings 32 can rotate within and along the inner surface of the push tube 18. A thrust washer 34 defines one axial end of the planetary roller assembly 21, contacting and retaining one of the planetary roller spaces 23 and the outer rings 32. The thrust washer 34 is also axially bound or constrained relative to the push tube 18 via a step or ledge 36 formed in the push tube 18.

The planetary rollers 22 may be axially fixed to an inner surface of the push tube 18, but able to rotate within to provide linear movement of the push tube 18. In operation, rotation of the screw 12 (via an electric motor or actuator, for example) can force a corresponding rotation of the planetary rollers 22 due to the engagement of the threading 24, 26. Meanwhile, the external threading 28 engages the internal threading 30 of the outer rings 32. The engagement of the threading 24, 26, 28, 30 forces the push tube 18 to move axially from the planetary roller assembly as the screw 12 rotates about its central axis. When the clevis 14 is connected to an external component (such as a lawn mower deck, as described above), the external component can move linearly (e.g., up and down) with the linear movement of the push tube 18.

The planetary roller screw 10 may sometimes be subject to large amounts of shock load. In particular, if the planetary roller screw 10 is operatively connected to a large piece of equipment that can be subject to sudden jerks or shocks, the force can be transferred through the roller screw 10. For example, if the planetary roller screw 10 is coupled to a mower deck of a lawn mower to move the mower deck vertically to set various grass-cutting heights, the lawn mower may travel over an impediment such as a rock that could cause a large shock load to travel through the planetary roller screw 10. If left unaccounted for, this large shock load could damage components of the roller screw.

To account for this type of potential large shock load, a shock absorber 40 is utilized within the drive nut assembly 20. In one embodiment, the shock absorber 40 is a cylindrical member located about the screw 12. The shock absorber 40 may be located on an opposite side of the planetary rollers 22 relative to the clevis 14 along the screw 12. The shock absorber 40 may be made of polymer such as polyurethane. This provides the shock absorber 40 with rigid yet resilient characteristics suitable for absorbing and distributing shock loads. The shock absorber 40 may be made of or include other suitable materials.

The shock absorber 40 may be cylindrical in shape, with an inner surface 42 surrounding the threads of the screw 12, and an outer surface 44 in sliding engagement with the push tube. The inner surface 42 may be smooth (i.e., not threaded), along the inner surface 42 to slide along the threading 26 of the screw 12 as the screw 12 rotates.

In one embodiment, the shock absorber 40 is bound on either axial end by a retainer ring and a spring. In particular, the shock absorber 40 has a first axial end 46 and a second axial end 48. The first axial end 46 contacts a retainer ring 50 disposed about the screw 12. The retainer ring 50 may be affixed or mounted to the push tube 18, and may axially retain the shock absorber 40. The second axial end 48 contacts one or more preloaded springs 52. The preload spring 52 can be a single annular spring extending about the spindle, or can be one or more springs that do not individually extend about the spindle. The spring 52 is disposed axially between and contacts one of the outer rings 32 and the shock absorber 40. The spring 52 preloads the drive nut assembly 20 to minimize or eliminate backlash when a shock force is absorbed. In such an arrangement, it can be said that the shock absorber 40 is located adjacent or proximate to the outer ring 32, with only the preload spring 52 axially separating the two components.

The planetary roller screw 10 also includes various electrical components, shown generally at 60, as part of the mechatronic system that makes up the roller screw. In one embodiment, a motor 62 includes a rotor 64 and a stator (not shown) to provide is coupled to the screw 12. When commanded by a controller or switch, the rotor 64 can rotate, causing the screw 12 to rotate and extend linearly.

As mentioned above, a large shock load may enter the planetary roller screw 10. The large shock load may enter through the attachment at the clevis 14 and travel axially into the screw 12. The load is then transmitted directly to the drive nut assembly 20. The shock absorber 40 in the drive nut assembly 20 enables the force to be dissipated in order to protect the screw 12 and its connected components from being mechanically overloaded. The force is absorbed by the shock absorber 40, which allows the energy to dissipate before the static load limit of the components is reached. This can cause compression of the material (e.g., polymeric) of the shock absorber. Also, some of the force can be dissipated radially outward to the push tube 18, and axially to the retainer ring 50. After the load has been absorbed by the shock absorber 40 and/or dissipated, the shock absorber 40 can decompress back to its normal state and act as a rigid member in the drive nut assembly 20 until the next shock load is realized.

While one example of implementation of the planetary roller screw 10 is in a lawn mower, it should be understood that this is merely an example and is not a limited use of the roller screw 10. The planetary roller screw may be utilized in any environment in which a controlled, linear actuation or movement of a component is desired, such as in manufacturing settings, tooling, clamping, and automotive settings such as shocks, lifts, etc.

The planetary roller screw described above provides an improved packaging by reducing the amount of axial space necessary to absorb any shock. With the placement of the shock absorber within the housing of the roller screw and adjacent to the planetary roller assembly, additional axial construction space is not needed, or is at least minimized.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

Below is a list of parts shown in the illustrated embodiment. It should be understood that the use of these terms in the above description or in the claims is not intended to be limited to only how these terms are illustrated in the Figures.
- 10 planetary roller screw
- 12 screw
- 14 clevis
- 16 outer housing
- 18 push tube
- 20 drive nut assembly
- 21 planetary roller assembly
- 22 planetary roller
- 23 planetary roller spacers
- 24 internal threading of planetary roller
- 26 external threading of screw
- 28 external threading of planetary roller
- 30 internal threading of outer rings
- 32 outer rings
- 34 thrust washer
- 36 step or ledge
- 40 shock absorber
- 42 inner surface of shock absorber
- 44 outer surface of shock absorber
- 46 first axial end
- 48 second axial end
- 50 retainer ring
- 52 preload spring
- 60 electrical components
- 62 motor
- 64 rotor

What is claimed is:

1. A planetary roller screw configured to convert rotary motion into linear motion or vice versa, the planetary roller screw comprising:
an outer housing;
a hollow push tube disposed within the outer housing and extending along a linear axis within the outer housing;
a threaded spindle configured to move axially along the linear axis and rotate about the linear axis, the threaded spindle having external threading; and
a drive nut assembly disposed radially between the threaded spindle and the push tube, the drive nut assembly including
a plurality of planetary rollers arranged about the threaded spindle, each planetary roller having (i) internal threading engaged with the external threading of the threaded spindle, and (ii) external threading,
an outer ring having (i) internal threading engaged with a portion of the external threading of the planetary rollers, and (ii) an outer surface engaged with an internal surface of the push tube, and
a shock absorber mechanically coupled to the outer ring, disposed about the threaded spindle and configured to absorb a shock load provided to the threaded spindle.

2. The planetary roller screw of claim 1, further comprising a preload spring disposed axially between the outer ring and the shock absorber.

3. The planetary roller screw of claim 2, wherein the preload spring contacts the shock absorber and either the outer ring or an associated spacer.

4. The planetary roller screw of claim 1, wherein the shock absorber is a hollow cylinder.

5. The planetary roller screw of claim 4, wherein the shock absorber includes a non-threaded inner surface and a non-threaded outer surface.

6. The planetary roller screw of claim 1, wherein the shock absorber is made of polyurethane.

7. The planetary roller screw of claim 1, wherein the shock absorber has a first axial end contacting a retainer ring disposed about the threaded spindle, and a second axial end contacting a preload spring.

8. A rod-style actuator comprising:
a housing;
a threaded rod configured to move linearly through the housing; and
a drive nut assembly disposed radially between the threaded rod and the housing, the drive nut assembly having a threaded inner surface engaging the threaded rod and a non-threaded outer surface engaging the housing, the drive nut assembly further including a cylindrical polymeric shock absorber disposed about the threaded rod and configured to absorb a shock load provided to the threaded rod.

9. The rod-style actuator of claim 8, wherein the drive nut assembly includes a plurality of planetary rollers arranged about the threaded rod, each planetary roller having internal threading engaged with external threading of the threaded rod, wherein the shock absorber is located axially adjacent to the planetary rollers.

10. The rod-style actuator of claim 9, further comprising an electrical motor configured to cause rotation of the threaded rod, wherein rotation of the threaded rod moves threads of the threaded rod along the internal threading of the planetary rollers to move the threaded rod in an axial direction.

11. The rod-style actuator of claim 9, wherein each planetary roller has external threading, and the drive nut assembly includes an outer ring having (i) internal threading engaged with a portion of the external threading of the planetary rollers.

12. The rod-style actuator of claim 11, wherein the shock absorber is coupled to the outer ring.

13. The rod-style actuator of claim 12, further comprising a preload spring located axially between and contacting the outer ring and the shock absorber.

14. The rod-style actuator of claim 8, wherein the shock absorber has a non-threaded inner surface disposed about the threaded rod, and a non-threaded outer surface engaging an inner surface of the housing.

15. A mechatronic linear actuator comprising:
a rod having external threading;
one or more rollers disposed about the rod, each roller having (i) internal threading engaged with the external threading of the rod, and (ii) external threading;
an outer ring having internal threading engaged with the external threading of each of the one or more rollers; and
a shock absorber disposed about the rod and axially proximate to the outer ring, wherein the shock absorber is made of a polymeric material that is configured to axially compress when subjected to an axial shock load to inhibit the rod from being mechanically overloaded.

16. The mechatronic linear actuator of claim 15, wherein the shock absorber is configured to return to a non-compressed state when the axial shock load is removed.

17. The mechatronic linear actuator of claim 15, further comprising a housing having an internal surface surrounding the outer ring and the shock absorber, wherein the outer ring has a non-threaded outer surface engaged with the internal surface of the housing.

18. The mechatronic linear actuator of claim 17, wherein the one or more rollers includes a plurality of planetary rollers axially relative to the housing, wherein rotation of the rod causes linear motion of the rod relative to the planetary rollers via the engagement between the external threading of the rod and the internal threading of the planetary rollers.

19. The mechatronic linear actuator of claim 15, further comprising one or more preload springs axially between and connecting the shock absorber and the outer ring.

20. The mechatronic linear actuator of claim 15, wherein the shock absorber is made of polyurethane and includes a non-threaded inner surface engaging the rod and a non-threaded outer surface.

* * * * *